US007622095B2

(12) United States Patent
Li et al.

(10) Patent No.: US 7,622,095 B2
(45) Date of Patent: *Nov. 24, 2009

(54) CATALYST COMPOSITION FOR USE IN A LEAN $NO_x$ TRAP AND METHOD OF USING

(75) Inventors: John Li, Canton, MI (US); Christian Goralski, Jr., St. Paul, MN (US); William Watkins, Toledo, OH (US); George Graham, Ann Arbor, MI (US); Harendra Gandhi, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 701 days.

This patent is subject to a terminal disclaimer.

(21) Appl. No.: 11/156,898

(22) Filed: Jun. 20, 2005

(65) Prior Publication Data

US 2006/0034740 A1    Feb. 16, 2006

Related U.S. Application Data

(60) Provisional application No. 60/601,069, filed on Aug. 12, 2004, provisional application No. 60/601,027, filed on Aug. 12, 2004, provisional application No. 60/601,049, filed on Aug. 12, 2004, provisional application No. 60/600,933, filed on Aug. 12, 2004.

(51) Int. Cl.
*B01D 53/94* (2006.01)
*B01J 23/02* (2006.01)
*B01J 23/46* (2006.01)

(52) U.S. Cl. .............. 423/213.2; 423/213.5; 423/239.1; 423/245.3; 423/247; 502/325; 502/328; 502/340; 60/274; 60/282; 60/299; 60/302

(58) Field of Classification Search ................. 502/325, 502/328, 340; 423/213.2, 213.5, 239.1, 245.3, 423/247; 60/274, 282, 299, 302
See application file for complete search history.

(56) References Cited

U.S. PATENT DOCUMENTS

| 3,819,536 | A | * | 6/1974 | Dalla Betta et al. ......... 502/302 |
| 3,972,837 | A | * | 8/1976 | Acres et al. ................. 502/328 |
| 4,001,371 | A | | 1/1977 | Remeika et al. |
| 4,049,583 | A | | 9/1977 | Lauder |
| 4,077,913 | A | | 3/1978 | Acres et al. |
| 4,089,810 | A | * | 5/1978 | Diwell et al. ............... 502/302 |
| 4,127,510 | A | | 11/1978 | Harrison et al. |
| 4,162,235 | A | | 7/1979 | Acres et al. |
| 4,200,554 | A | * | 4/1980 | Lauder ...................... 502/326 |
| 4,956,330 | A | | 9/1990 | Elliott et al. |
| 5,064,803 | A | | 11/1991 | Nunan |
| 5,427,753 | A | | 6/1995 | Miura et al. |
| 5,435,981 | A | | 7/1995 | Ichiki et al. |
| 5,449,504 | A | | 9/1995 | Kasahara et al. |
| 5,589,147 | A | | 12/1996 | Farnos et al. |
| 5,597,771 | A | | 1/1997 | Hu et al. |
| 5,635,142 | A | | 6/1997 | Ichiki et al. |
| 5,747,401 | A | | 5/1998 | Cuif |
| 5,747,410 | A | | 5/1998 | Muramatsu et al. |
| 5,756,057 | A | | 5/1998 | Tsuchitani et al. |
| 5,837,212 | A | | 11/1998 | Hepburn et al. |
| 5,879,645 | A | | 3/1999 | Park et al. |
| 5,972,821 | A | | 10/1999 | Nojima et al. |
| 5,989,507 | A | | 11/1999 | Sung et al. |
| 5,992,142 | A | | 11/1999 | Pott |
| 6,003,303 | A | | 12/1999 | Peter-Hoblyn et al. |
| 6,087,298 | A | | 7/2000 | Sung et al. |
| 6,174,835 | B1 | | 1/2001 | Naito et al. |
| 6,350,423 | B1 | * | 2/2002 | Aoyama ...................... 423/247 |
| 6,391,822 | B1 | | 5/2002 | Dou et al. |
| 6,419,890 | B1 | | 7/2002 | Li |
| 6,477,834 | B1 | | 11/2002 | Asanuma et al. |
| 6,497,848 | B1 | | 12/2002 | Deeba et al. |
| 6,531,425 | B2 | | 3/2003 | Golden |
| 6,555,492 | B2 | | 4/2003 | Faber et al. |
| 6,620,762 | B2 | | 9/2003 | Tan et al. |
| 6,699,448 | B2 | | 3/2004 | Wu et al. |
| 6,777,370 | B2 | | 8/2004 | Chen |
| 6,821,925 | B2 | | 11/2004 | Carruthers et al. |
| 6,852,666 | B1 | | 2/2005 | Bouly et al. |
| 6,864,212 | B2 | | 3/2005 | Tanev |

(Continued)

FOREIGN PATENT DOCUMENTS

EP    0 625 633 A1    11/1994

(Continued)

OTHER PUBLICATIONS

Gellings, Paul J. et al., "Solid state aspects of oxidation catalysis" Catalysis Today 58, Elsevier Science B.V., 2000, pp. 1-53.

(Continued)

*Primary Examiner*—Timothy C Vanoy
(74) *Attorney, Agent, or Firm*—Dinsmore & Shohl LLP (57) ABSTRACT

A lean $NO_x$ trap composition. The lean $NO_x$ trap composition utilizes ruthenium in place of higher cost metals such as platinum. The lean $NO_x$ trap composition provides high $NO_x$ storage efficiency and high $NO_x$ conversion efficiency when incorporated in a lean $NO_x$ trap. A method of removing harmful gases using the lean $NO_x$ trap composition is also described.

20 Claims, 7 Drawing Sheets

U.S. PATENT DOCUMENTS

| | | |
|---|---|---|
| 6,923,945 B2 | 8/2005 | Chen |
| 7,213,395 B2 * | 5/2007 | Hu et al. .................. 60/286 |
| 2002/0076373 A1 | 6/2002 | Molinier et al. |
| 2002/0103078 A1 | 8/2002 | Hu et al. |
| 2002/0155040 A1 | 10/2002 | Sakanushi et al. |
| 2003/0021745 A1 | 1/2003 | Chen |
| 2003/0103886 A1 | 6/2003 | Dou |
| 2003/0106306 A1 | 6/2003 | Nakatani et al. |
| 2003/0139288 A1 | 7/2003 | Cai et al. |
| 2003/0147796 A1 | 8/2003 | Suga et al. |
| 2003/0154713 A1 | 8/2003 | Hiratsuka et al. |
| 2003/0172646 A1 | 9/2003 | Hiratsuka et al. |
| 2003/0175192 A1 | 9/2003 | Hu et al. |
| 2003/0181324 A1 | 9/2003 | Hotta et al. |
| 2003/0198582 A1 | 10/2003 | Golden |
| 2004/0043343 A1 | 3/2004 | Kamijo |
| 2004/0077492 A1 | 4/2004 | Yaluris et al. |
| 2004/0209772 A1 * | 10/2004 | Fukunaga et al. .......... 502/332 |
| 2005/0148463 A1 | 7/2005 | Jen et al. |
| 2006/0034741 A1 * | 2/2006 | Li et al. .................. 423/213.5 |
| 2006/0035782 A1 | 2/2006 | Jen et al. |

FOREIGN PATENT DOCUMENTS

| | | | |
|---|---|---|---|
| EP | 0 982 487 | A1 | 3/2000 |
| EP | 1 241 329 | A2 | 9/2002 |
| EP | 1 302 647 | A2 | 4/2003 |
| EP | 1 318 282 | A1 | 6/2003 |
| EP | 1 413 718 | A1 | 4/2004 |
| JP | 2001-009271 | | 1/2001 |
| WO | WO 00/50168 | | 8/2000 |
| WO | WO 01/09271 | A1 | 2/2001 |
| WO | WO 02/09852 | A2 | 2/2002 |
| WO | WO 02/058825 | A2 | 8/2002 |
| WO | WO 02/083301 | A2 | 10/2002 |
| WO | WO 03/008095 | A2 | 1/2003 |
| WO | WO 03/040259 | A2 | 5/2003 |

OTHER PUBLICATIONS

Kass et al, "Selective Catalytic Reduction of Diesel Engine NOx Emissions Using Ethanol as a Reductant" Proceedings: 2003 DEER Conference, U.S. Dept. of Energy 9th Diesel Engine Emissions Reduction Conference, Newport, Rhode Island, Aug. 24-28, 2003, pp. 1-8.
Office Action for U.S. Appl. No. 10/710,920 dated Apr. 2, 2008.
Office Action for U.S. Appl. No. 11/157,192 dated Oct. 28, 2008.
Office Action for U.S. Appl. No. 10/710,920 dated Dec. 5, 2008.
Office Action of U.S. Appl. No. 10/710,922 dated Dec. 15, 2005.
Notice of Allowance of U.S. Appl. No. 10/710,922 dated Jun. 14, 2006.
Supplemental Notice of Allowability of U.S. Appl. No. 10/710,922 dated Sep. 15, 2006.
Restriction Election Requirement of U.S. Appl. No. 11/539,722 dated Jan. 28, 2009.
Office Action of U.S. Appl. No. 11/539,722 dated May 27, 2009.
Office Action of U.S. Appl. No. 11/157,192 dated Jun. 15, 2009.

* cited by examiner

CATALYST COMPOSITION FOR USE IN A LEAN $NO_x$ TRAP AND METHOD OF USING

This application claims the benefit of provisional application Ser. No. 60/601,069, entitled Catalyst Composition for Use in a Lean $NO_x$ Trap, filed Aug. 12, 2004; provisional application Ser. No. 60/601,027, entitled Catalyst Composition for Use in a Lean $NO_x$. Trap, filed Aug. 12, 2004; provisional application Ser. No. 60/601,049, entitled Catalyst Composition for Use in a Lean $NO_x$. Trap, filed Aug. 12, 2004; and provisional application Ser. No. 60/600,933, entitled Method of Making a Catalyst Composition for Use in a Lean $NO_x$ Trap, filed Aug. 12, 2004, all of which are incorporated herein by reference.

BACKGROUND OF THE INVENTION

The present invention relates to a catalyst composition for use in a lean $NO_x$ trap, and more particularly, to a low cost catalyst composition for use in a lean $NO_x$ trap for use in lean-burn engines such as gasoline and diesel engines and to methods of using such a composition.

Environmental concerns and government regulations have led to efforts to improve the removal of noxious combustion by-products from vehicle engine exhausts. Typically, the combustion by-products include carbon monoxide, hydrocarbons, sulfur oxides and various nitrogen oxides ($NO_x$). In recent years, lean-burn engines such as gasoline and diesel engines have become more widely used as they offer improved fuel economy. However, because such engines operate under fuel-lean conditions, it is difficult to achieve reduction and removal of $NO_x$ in the oxidizing atmosphere of the engine exhaust. One solution to this problem has been the use of lean $NO_x$ traps ("LNT"), which typically include a catalyst comprising one or more precious metals such as platinum (Pt), palladium (Pd), or rhodium (Rh), and an alkali earth metal such as barium, and which are provided on a support material such as alumina. The precious metal catalysts are capable of absorbing or storing nitrogen oxides during lean-burn engine operation (where there is excess oxygen) and releasing and converting them when the oxygen concentration in the exhaust gas is lowered.

However, while such traps have been effective in the removal of $NO_x$ from the exhaust of lean burn engines, they require high loadings of precious metals such as platinum, which are very expensive. Accordingly, the high cost of such traps has prevented their wide application.

Attempts have been made to develop lean $NO_x$ traps with non-precious metals in an effort to reduce costs. See, for example, U.S. Pat. No. 5,837,212, which teaches a catalyst for use in a lean $NO_x$ trap comprised of manganese and potassium. However, while such a trap has effective NO storage efficiency, the trap does not effectively convert the stored $NO_x$ to $N_2$. It is very important for the catalyst materials to exhibit good $NO_x$ storage efficiency as well as effective $NO_x$ conversion because low conversion efficiency will result in higher $NO_x$ emissions. By "storage efficiency," we mean the efficiency of the LNT to store $NO_x$ during the lean period. By "conversion efficiency" we mean the efficiency of the LNT to convert $NO_x$ during both the lean and rich periods.

Ruthenium has also been proposed for use as a reducing catalyst component, typically in combination with other precious metals. See, for example, U.S. Pat. No. 5,756,057. While ruthenium is also considered a precious metal, it is much lower in cost than platinum and other precious metals. However, although ruthenium has generally been regarded as an effective reducing catalyst for $NO_x$, we have not seen ruthenium being used as a catalyst for a lean $NO_x$ trap because its effeciveness for NO oxidation, which is the first step in reactions involving a lean $NO_x$ trap, has not been demonstrated.

Accordingly, there is a need in the art for a catalyst composition for use in a lean $NO_x$ trap which is low in cost, which exhibits high $NO_x$ storage efficiency, and high ($NO_x$ to $N_2$) conversion efficiency.

SUMMARY OF THE INVENTION

The present invention meets this need by providing a lean $NO_x$ trap composition utilizing ruthenium in place of higher cost precious metals such as platinum. The lean $NO_x$ trap composition provides high $NO_x$ storage efficiency and high $NO_x$ conversion efficiency when incorporated in a lean $NO_x$ trap.

According to one aspect of the invention, a lean $NO_x$ trap composition is provided. The lean $NO_x$ trap composition includes a support material; a ruthenium catalyst wherein the ruthenium catalyst is free of other precious metals; and a $NO_x$ absorbent material comprising an alkaline earth metal; wherein the lean $NO_x$ trap composition has a storage efficiency of at least 70% at a temperature in a range of from about 400° C. to about 500° C., and a conversion efficiency of at least 50% at a temperature in a range of from about 300° C. to about 450° C.

Another aspect of the invention involves a method of removing harmful gases from an automobile exhaust containing $NO_x$, CO, and hydrocarbons. The method includes contacting a lean $NO_x$ trap composition with a first exhaust gas mixture, the first exhaust gas mixture comprising exhaust gases from an internal combustion engine operating in a fuel-lean condition, the lean $NO_x$ trap composition comprising: a support material; a ruthenium catalyst wherein the ruthenium catalyst is free of other precious metals; and a $NO_x$ absorbent material comprising an alkaline earth metal; wherein the lean $NO_x$ trap composition has a storage efficiency of at least 70% at a temperature in a range of from about 400° C. to about 500° C., and a conversion efficiency of at least 50% at a temperature in a range of from about 300° C. to about 450° C.; and contacting the lean $NO_x$ trap composition with a second exhaust mixture, the second exhaust gas mixture comprising exhaust gases from the internal combustion engine operating in a fuel-rich condition.

DETAILED DESCRIPTION OF THE INVENTION

We have found that a ruthenium or ruthenium oxide catalyst can effectively oxidize NO, and demonstrates excellent $NO_x$ storage efficiency when it is incorporated into a lean $NO_x$ trap. The use of ruthenium allows lean $NO_x$ traps to be produced at much lower cost than previous traps which incorporate higher cost precious metals.

The catalyst composition can comprise a ruthenium catalyst, such as ruthenium or ruthenium oxide, in combination with an alkaline earth metal on a support material. The ruthenium catalyst component functions to oxidize NO to $NO_2$ and to reduce $NO_x$ to $N_2$, and is generally present in an amount of about 0.1 to about 10% by weight of washcoat, typically about 0.3 to about 5% by weight of washcoat, or about 0.5 to about 3% by weight of washcoat.

The alkaline earth metal functions to absorb $NO_x$ and is generally present in an amount of about 5 to about 50% by weight of washcoat, or about 5 to about 30% by weight of washcoat, or about 5 to about 20% by weight of washcoat. The alkaline earth metal is typically barium. Suitable barium precursors include, but are not limited to, barium oxide, barium carbonate, barium nitrate, or barium acetate.

The support material of the catalyst composition provides support to the catalyst and $NO_x$ absorbent components. Suitable support materials for use in the present invention include, but are not limited to, $Al_2O_3$, $SiO_2$, $TiO_2$, and zeolites. An alumina support is commonly used.

The catalyst composition may further include the use of stabilizers which provide thermal stability to the composition. Suitable stabilizers include, but are not limited to, rare earth oxides, such as lanthanum and cerium, and manganese, and zirconium. Other suitable thermal stabilizers include those disclosed in commonly assigned application Ser. No. 10/710,920, entitled Processing Methods And Formulations To Enhance Stability Of Lean $NO_x$ Trap Catalysts Based On Alkali- And Alkaline Earth Metal Compounds and commonly assigned application Ser. No. 10/710,922, entitled Thermally Stable Lean $NO_x$ Trap, the disclosures of which are hereby incorporated by reference.

The catalyst composition of the present invention can be incorporated into a lean $NO_x$ trap by any suitable process. A washcoating process will be described, although other processes could be used. The support material (for example, aluminum oxide) is first washcoated onto a monolithic substrate. Suitable substrates for use in the present invention include, but are not limited to, cordierite and metallic substrates. The substrate can be repeatedly washcoated with the support material until a washcoat weight of 20% to 45% is achieved. After each deposition, the substrate is dried at about 80° C. for about six hours and then calcined at temperatures up to about 600° C. for about six hours. When the washcoat level is achieved, a solution of the ruthenium catalyst component is prepared. The solution is deposited onto the substrate as a percentage of the washcoat. The ruthenium can be deposited two to three times to ensure a uniform distribution.

After each deposition of the catalyst, the substrate is dried at about 80° C. for about six hours and then calcined under reducing conditions at temperatures up to about 600° C. for about six hours. After the catalyst component has been applied, the alkaline earth metal is applied. The alkaline earth metal is deposited in an amount based on the amount of support material deposited. After each deposition, the substrate is dried at about 80° C. followed by calcination at temperatures up to about 600° C. for about six hours.

In use, the lean $NO_x$ trap of the present invention is placed in the exhaust of a vehicle having an engine which can operate in a fuel-lean condition and which contains $NO_x$ and other harmful gases. The trap is exposed to the exhaust gases from the engine operating in a fuel-lean condition and operating in a fuel-rich condition such that at least a portion of the $NO_x$ in the gas is converted to $N_2$, preferably at a temperature between about 125° C. and 700° C.

Generally, the lean $NO_x$ trap of the present invention has a storage efficiency of at least about 70% at a temperature in a range of from about 400° C. to about 500° C., and a conversion efficiency of at least about 50% at a temperature in a range of from about 300° C. to about 450° C. Typically, the storage efficiency is at least about 80% at a temperature in a range of from about 400° C. to about 500° C., and the conversion efficiency is at least about 60% at a temperature in a range of from about 300° C. to about 400° C. The storage efficiency can be at least about 90% at a temperature in a range of from about 400° C. to about 500° C., and the conversion efficiency can be at least about 60% at a temperature in a range of from about 300° C. to about 400° C.

One of the problems we encountered with ruthenium LNTs is that they tend to have a higher light-off temperature compared with similar platinum LNTs, i.e., the catalyst is effective in converting 50% of the $NO_x$ only at higher temperatures. This results in ineffective storage efficiency at low temperatures. A high $NO_x$ storage efficiency at low temperature is important because it broadens the applications in which the traps can be used and can increase operation flexibility.

We discovered that by eliminating the use of chlorine-containing Ru precursors and/or by adding magnesium to the catalyst composition, improved low temperature storage efficiency is obtained. The magnesium functions to lower the light-off temperature, and when used in combination with a Ru catalyst prepared from chlorine-free precursors, the light-off temperature may be reduced even further.

The magnesium is generally present in an amount of from about 1 to 20% by weight of washcoat, typically about 1 to 10% by weight of washcoat.

The lean $NO_x$ trap composition of this embodiment is generally prepared as described above, with the following changes. The ruthenium catalyst component is prepared from a chlorine-free precursor (if one is to be used), such as aqueous ruthenium nitrosyl nitrate, $Ru(NO)(NO_3)_3$. After the catalyst is applied to the substrate, the barium and magnesium (if present) are then prepared as a solution from, for example, barium acetate and magnesium nitrate. The weight ratio of Ba—Mg used in the catalyst composition is generally from about 50:50 to 95:5, and typically from about 70:30 to 90:10.

The amounts of Ba and Mg deposited may vary based on the amount of aluminum oxide deposited. The Ba/Mg solution can be washcoated onto the monolith substrate in about two depositions, each deposition followed by drying at 80° C. for six hours and calcining at 600° C. for six hours.

Another problem we found is that the oxidation activity and storage efficiency of lean $NO_x$ traps using ruthenium catalysts vary greatly, depending on how the catalyst composition is prepared.

We discovered that an optimum proximity between the catalyst component and the $NO_x$ absorbent material helps to improve for the oxidation activity and storage efficiency of the lean $NO_x$ trap.

One way of achieving optimum proximity of the catalyst component (Ru) and $NO_x$ absorbent material (Ba), is to deposit the ruthenium prior to depositing the barium compound. By optimum proximity, we mean the catalyst component and $NO_x$ absorbent material are positioned on the support material in such a way that optimum $NO_x$ storage efficiency and optimum conversion efficiency is achieved. This optimum proximity results in better conversion efficiency for a lean $NO_x$ trap utilizing a ruthenium/barium combination. The optimum proximity of the ruthenium and barium also maintains $NO_x$ storage efficiency, providing effective spill-over of the oxidized $NO_x$ ($NO_2$) to be stored. By spill-over, we mean the spillover of oxygen atoms from the ruthenium to the absorbent material (Ba) for oxidizing NO to $NO_2$ and further to $NO_3^-$, or the spillover of the $NO_2$ to the absorbent material.

Figure 8:
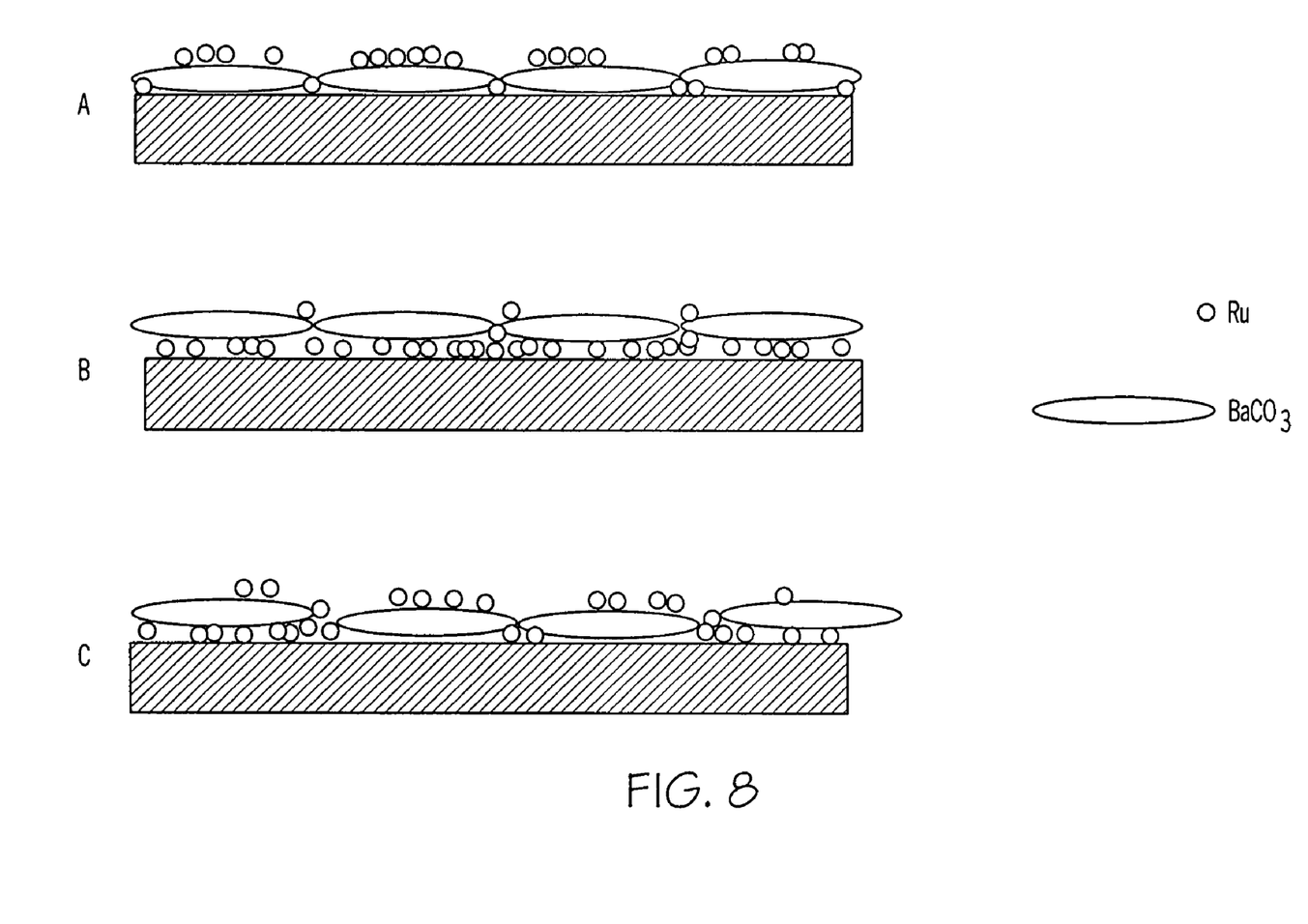
FIG. 8 is a schematic illustration of placement of the components in the catalyst.

Referring now to FIG. 8, a schematic illustration is shown of three possible positions of the catalysts in a LNT. FIG. 8A illustrates the catalyst when Ba is placed on the $Al_2O_3$ support first, followed by the introduction of Ru (Ba—Ru). FIG. 8B illustrates the catalyst when Ru is placed on the $Al_2O_3$ support first, followed by the introduction of Ba (Ru—Ba). FIG. 8C illustrates the catalyst when Ru and Ba are placed onto the $Al_2O_3$ support together (Ru—Ba co-deposition). FIG. 8B illustrates a desirable placement of ruthenium on the support followed by Ba to achieve optimum proximity.

The resulting trap demonstrates a $NO_x$ storage efficiency of at least 60% at a temperature between about 350 to about 475° C., and a conversion efficiency (NO to $NO_2$) of at least 50% at a temperature between about 375 to about 450° C.

In order that the invention may be more readily understood, reference is made to the following examples of compositions within the scope of the present invention, which examples are intended to be illustrative of the invention, but are not intended to be limiting in scope.

Examples 1 and 2 compare the use of ruthenium as a catalyst for an LNT with the use of platinum as a catalyst for an LNT.

EXAMPLE 1

Figure 1:
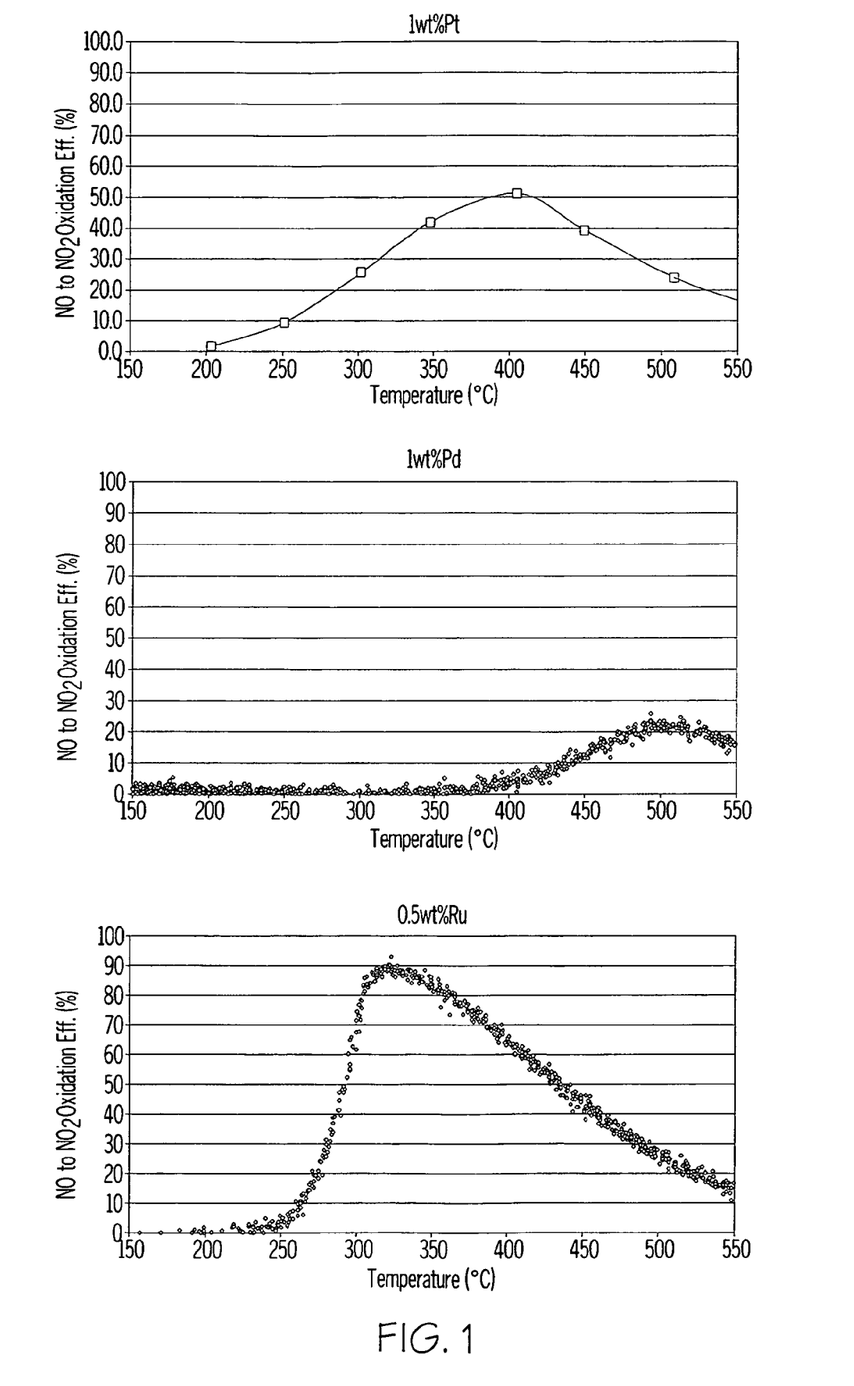
FIG. 1 is a series of graphs illustrating the NO to $NO_2$ oxidation activity of Pt and Pd catalysts in comparison with the Ru catalyst of the present invention.

Three catalyst compositions were prepared in accordance with the present invention. The first composition comprised 1% by weight platinum on an alumina support. The second composition comprised 1% by weight palladium on an alumina support, and the third composition comprised 0.5% by weight ruthenium on an alumina support. As shown in FIG. 1, the catalyst composition containing ruthenium exhibited much higher NO to $NO_x$ oxidation activity than the precious metal catalyst compositions.

EXAMPLE 2

Figure 2:
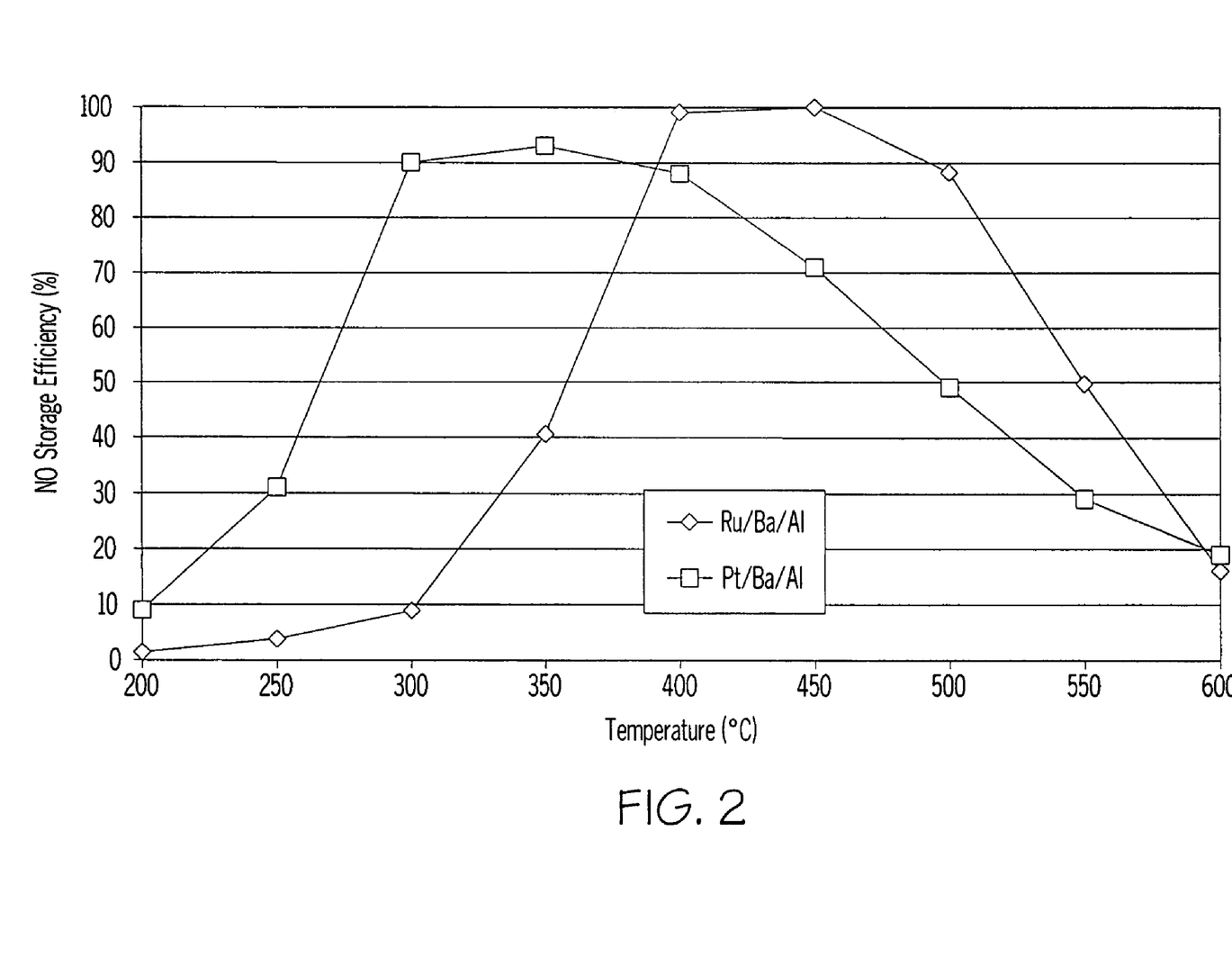
FIG. 2 is a graph illustrating a comparison of NO storage efficiency of a Pt based LNT catalyst with a Ru based LNT catalyst in accordance with the present invention.

A first lean $NO_x$ trap was prepared from a catalyst composition comprising 2% by weight platinum and 20% barium oxide on alumina. A second lean $NO_x$ trap was prepared from a catalyst composition in accordance with the present invention which comprised 2% by weight ruthenium and 20% barium oxide on alumina. The two traps were tested for NO storage efficiency by subjecting them to lean-rich cyclic testing in a flow reactor with a space velocity of 25,000 $hr^{-1}$ with the feedgas during the lean cycle containing 500 ppm NO, 5% $O_2$, 10% water, 10% $CO_2$, and balance nitrogen; and during the rich cycle containing 5% CO, 500 ppm NO, 10% water, 10% $CO_2$, 1.67% $H_2$ and balance $N_2$. As can be seen from FIG. 2, the lean $NO_x$ trap of the present invention demonstrated higher NO storage efficiency compared to a Pt-based LNT.

The effect on light-off temperature of the use of a chlorine-free ruthenium precursor and the use of magnesium was explored in Example 3.

EXAMPLE 3

A series of lean $NO_x$ traps were prepared using a wet impregnation method. In the reference sample, the LNT contained 2% by weight Ru, impregnated from $RuCl_3$ and dried at 80° C. and calcined at 600° C. under a reducing condition for 6 hours. 20% by weight Ba (from barium acetate) was then coated on and dried and calcined under the same conditions. A lean $NO_x$ trap was prepared using a ruthenium catalyst prepared using $Ru(NO)(NO_3)_3$ as the precursor. Another LNT was prepared which included Mg with a Ba—Mg weight ratio of 80:20 (prepared from barium acetate and magnesium nitrate).

The test conditions were as follows: the monolith catalyst was crushed and sieved to 40-60 mesh. For each test, 300 mg of catalyst was used. The total flow rate was kept at 750 ml/min. This amounts to an equivalent space velocity of approximately 80 k $hr^{-1}$. The feedgas contained 500 ppm NO, 10% $CO_2$, 10% $H_2O$, with $N_2$ balance. In addition, during the lean condition (such as during the oxidation reaction), the feedgas contained 6% $O_2$. During the rich period, the feedgas contained 4% CO and 1.3 $H_2$ (zero $O_2$). The feedgas did not contain hydrocarbons or sulfur during the reaction unless specified.

Figure 3:
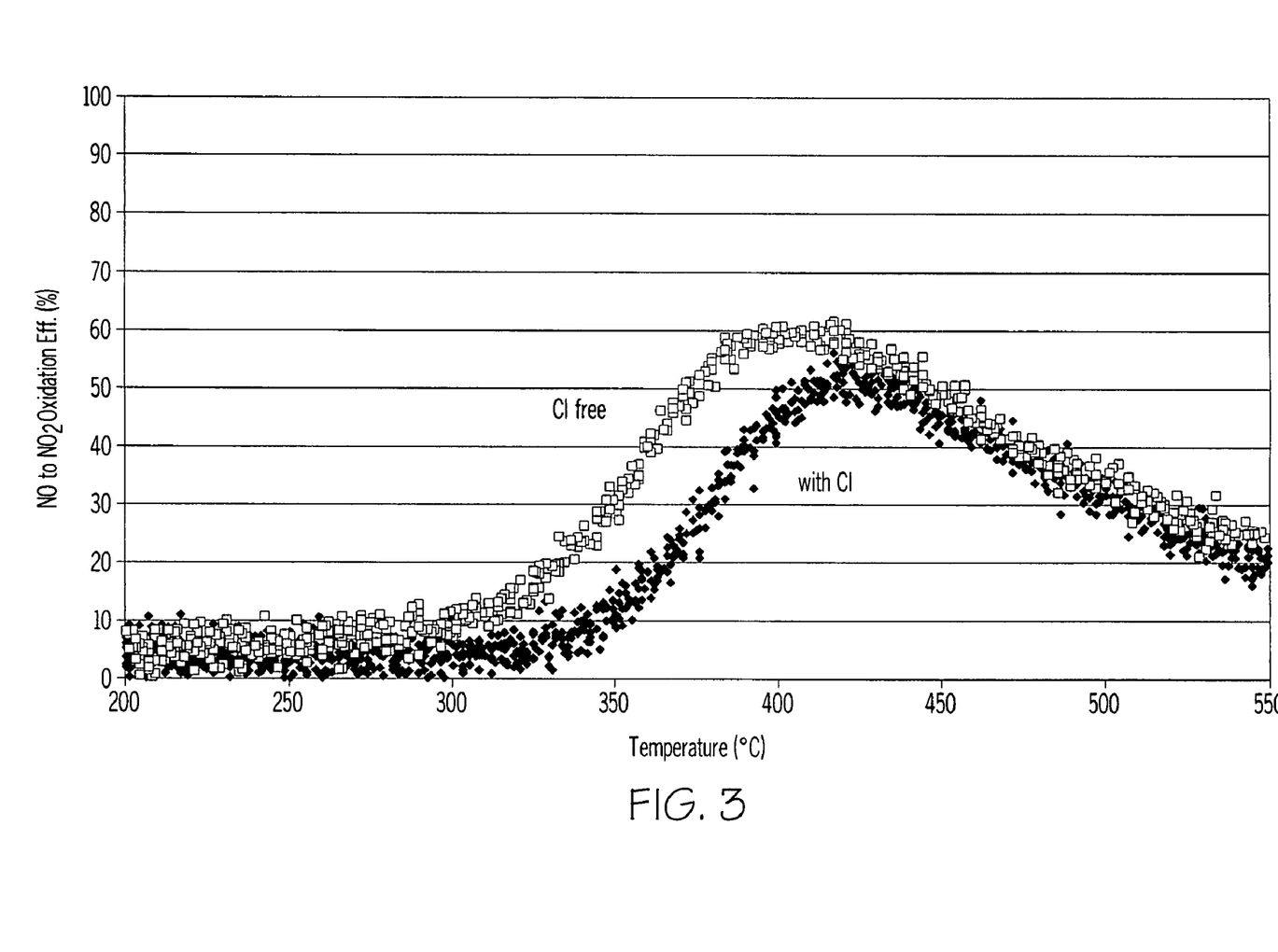
FIG. 3 is a graph illustrating the oxidation activity of a model monolith LNT prepared in accordance with one embodiment of the present invention and an LNT prepared using a chlorine-containing precursor.

FIG. 3 illustrates the oxidation activities of the model monolith 2% Ru/20% Ba/$Al_2O_3$ lean $NO_x$ traps, one of which was made from a $RuCl_3$ precursor, the other made from $Ru(NO)(NO_3)_3$ tested in a micro-reactor. As shown, the oxidation activity of the Cl-free LNT is higher than that of the Cl-containing LNT, especially at lower temperature. This indicates that Cl poisons the Ru, especially at low temperature.

Figure 4:
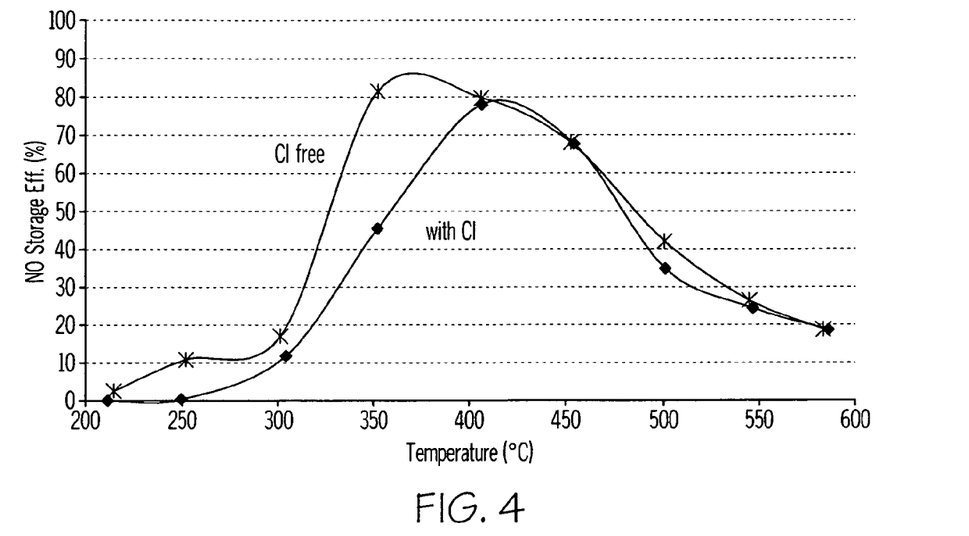
FIG. 4 is a graph illustrating the $NO_x$ storage efficiency of a model monolith LNT prepared in accordance with the present invention compared with a LNT prepared using a chlorine containing precursor.

FIG. 4 illustrates the storage efficiency of the two lean $NO_x$ traps tested in a micro-reactor. As can be seen, the $NO_x$ storage efficiency of the Cl-free sample is higher than that of the Cl-containing sample, especially at low temperature.

Figure 5:
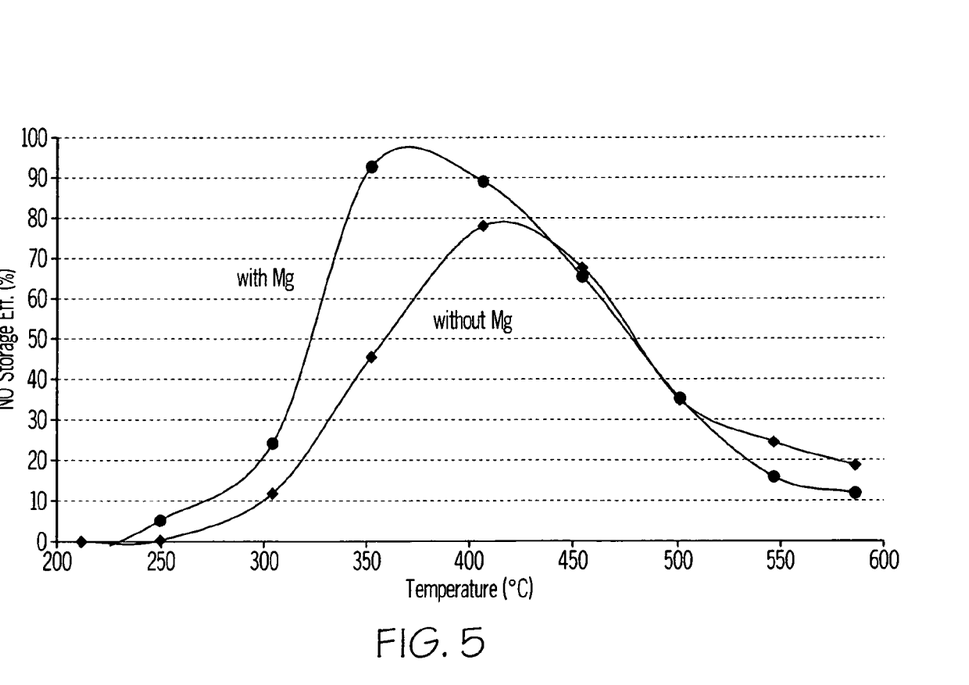
FIG. 5 is a graph illustrating the $NO_x$ storage efficiency of lean $NO_x$ traps prepared with and without the addition of Mg.

FIG. 5 illustrates the storage efficiency of two lean $NO_x$ traps, one with 2% Ru/20% Ba/Al, and the other with 2% Ru/16% Ba-4% Mg/Al, both using $RuCl_3$ as the Ru precursor. As can be seen, the storage efficiency improves with the inclusion of Mg.

The effect of the proximity of the catalyst component (Ru) and $NO_x$ absorbent material (Ba) is illustrated in Examples 4 and 5.

EXAMPLE 4

Model catalyst powders were prepared and tested for NO storage efficiency and NO to $NO_2$ oxidation activity in a micro-reactor.

For the tests, equal amounts (wt %) of Ru/$Al_2O_3$ (2% Ru) and BaO/$Al_2O_3$ (20% BaO) powders were sieved and then either mechanically mixed (by shaking the sample vial) or wet ball-milled. 100 mg of powder was then mixed with 200 mg of equal sized blank cordierite. Mechanical mixing and wet ball-milling create different proximity between the active components of Ru and Ba. Mechanical mixing resulted in infinite molecular distance between Ru and Ba, while ball milling resulted in increased proximity between Ru and Ba.

Figure 6:
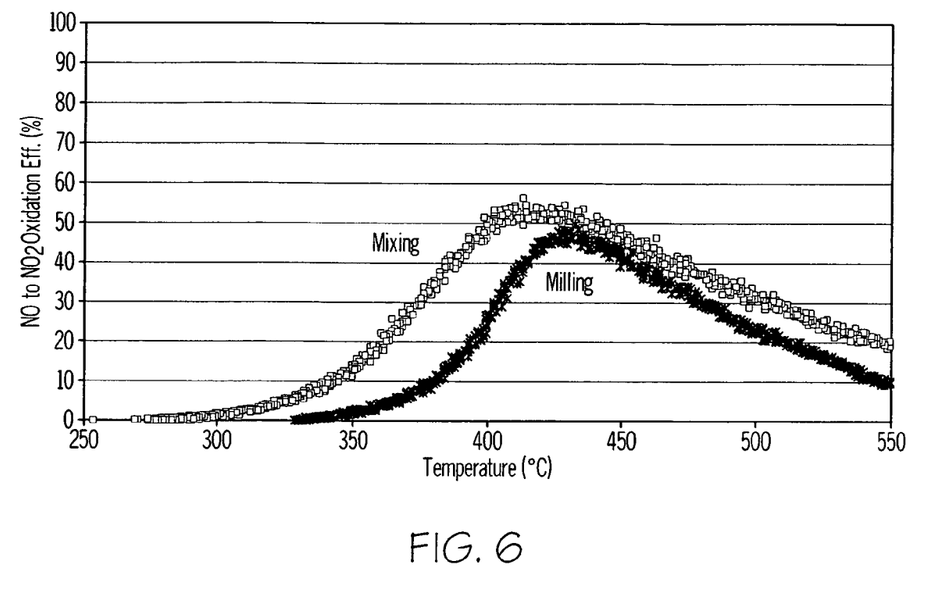
FIG. 6 is a graph illustrating the oxidation activity of model catalyst powders prepared by mechanical mixing and wet ball-milling.
Figure 7:
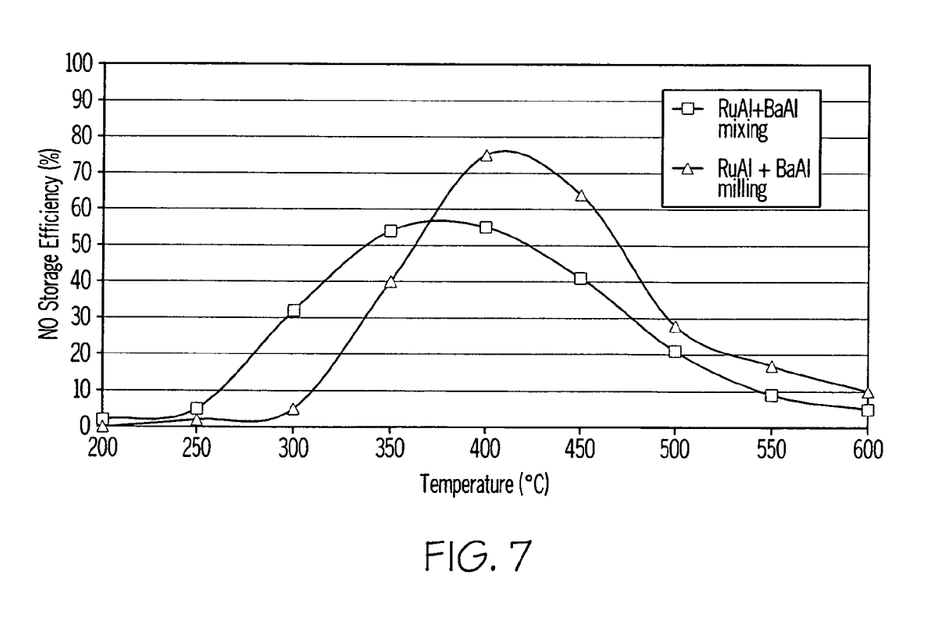
FIG. 7 is a graph illustrating the $NO_x$ storage efficiency of model catalyst powders prepared by mechanical mixing and wet ball-milling.

FIG. 6 illustrates that the oxidation activity of the mixed sample is higher than that of the milled sample, especially at low temperature. FIG. 7 illustrates the NO storage efficiencies of the mixed and milled samples. The mixed sample has a lower efficiency at high temperatures (>400° C.), but exhibits higher efficiency at low temperatures.

EXAMPLE 5

Figure 9:
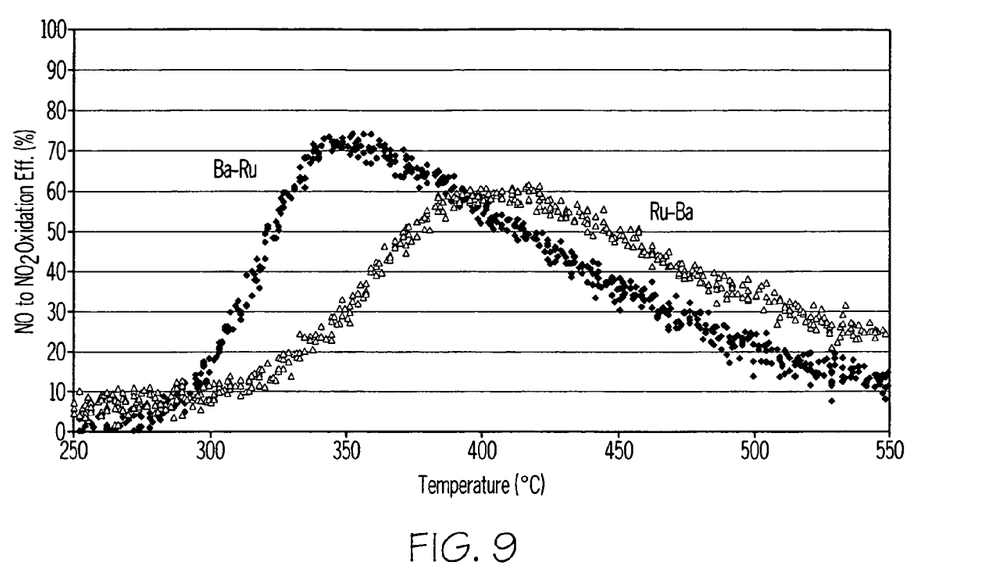
FIG. 9 is a graph illustrating NO to $NO_2$ oxidation activity of crushed monolith catalysts prepared by different methods.

Crushed monolith model catalysts comprising (2% Ru/20% BaO/$Al_2O_3$) were prepared. In the first sample, Ba was deposited onto the alumina support followed by Ru. In the second sample, Ru was deposited first followed by Ba. Both the Ru and BaO each went through 80° C. drying overnight and 600° C. reduced calcinations for 6 hours. FIG. 9 illustrates the oxidation activity of the catalysts tested in a micro-reactor.

Figure 10:
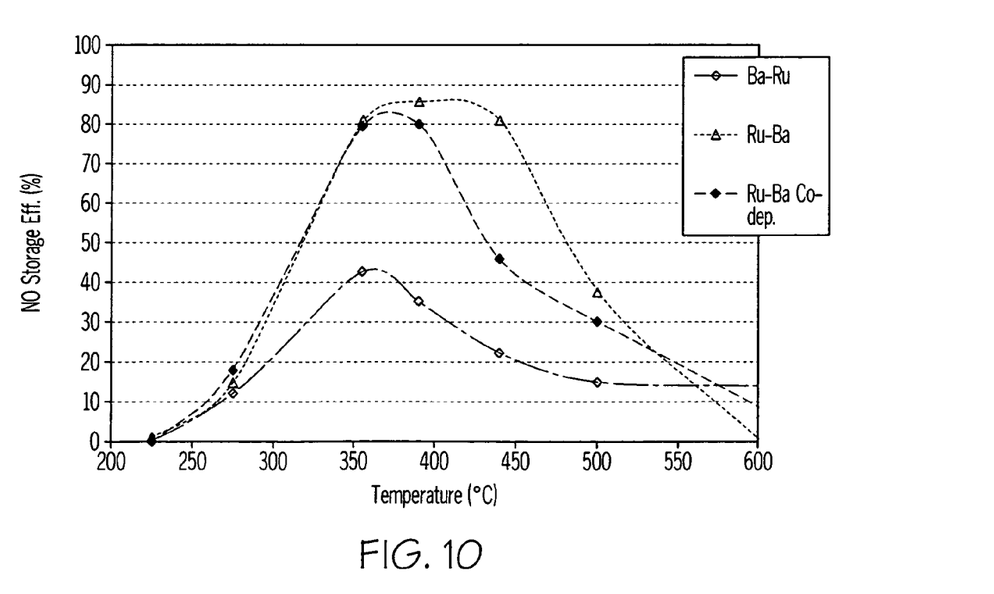
FIG. 10 is a graph illustrating the NO storage efficiency of crushed monolith model catalysts prepared three different ways.

A third sample was prepared by impregnating Ru and Ba onto $Al_2O_3$ together followed by drying and calcining. FIG. 10 illustrates the NO storage efficiency of the model catalysts (2% Ru/20% BaO/$Al_2O_3$) tested in a flow reactor (space velocity at 80 k $hr^{-1}$). The results show that when Ru is deposited on the $Al_2O_3$ first and BaO last, the NO storage efficiency is higher than when Ru—Ba is co-impregnated, and much higher than when BaO was impregnated onto $Al_2O_3$ first and Ru was put on last.

The above data shows that the optimum proximity of Ru and Ba is as shown in FIG. 8B described above, i.e., Ru is deposited first, which results in high oxidation activity, followed by Ba. This order of deposition provides maximum spill-over for higher $NO_x$ storage efficiency.

While certain representative embodiments and details have been shown for purposes of illustrating the invention, it will be apparent to those skilled in the art that various changes in the compositions and methods disclosed herein may be made without departing from the scope of the invention.

What is claimed is:

1. A lean $NO_x$ trap composition comprising:
a support material;
a ruthenium catalyst wherein the ruthenium catalyst is free of other precious metals; and
a $NO_x$ absorbent material comprising an alkaline earth metal;
wherein the lean $NO_x$ trap composition has a storage efficiency of at least 70% at a temperature in a range of from about 400° C. to about 500° C., and a conversion efficiency of at least 50% at a temperature in a range of from about 300° C. to about 450° C.

2. The lean $NO_x$ trap composition of claim 1 wherein the lean $NO_x$ trap composition has a storage efficiency of at least 80% at a temperature in a range of from about 400° C. to about 500° C., and a conversion efficiency of at least 60% at a temperature in a range of from about 300° C. to about 400° C.

3. The lean $NO_x$ trap composition of claim 1 wherein the lean $NO_x$ trap composition has a storage efficiency of at least 90% at a temperature in a range of from about 400° C. to about 500° C., and a conversion efficiency of at least 60% at a temperature in a range of from about 300° C. to about 400° C.

4. The lean $NO_x$ trap composition of claim 1 wherein the ruthenium catalyst is selected from ruthenium, or ruthenium oxide.

5. The lean $NO_x$ trap composition of claim 1 wherein the lean NOx trap composition comprises about 0.1 to about 10% by weight of washcoat of ruthenium catalyst.

6. The lean $NO_x$ trap composition of claim 1 wherein the lean $NO_x$ trap composition comprises about 5 to about 50% by weight of washcoat of alkaline earth metal compound.

7. The lean $NO_x$ trap composition of claim 6 wherein the alkaline earth metal is barium.

8. The lean $NO_x$ trap composition of claim 7 wherein barium is applied using a precursor selected from barium oxide, barium carbonate, barium nitrate, or barium acetate.

9. The lean $NO_x$ trap composition of claim 1 wherein the ruthenium catalyst is prepared from a chlorine-free precursor.

10. The lean $NO_x$ trap composition of claim 9 wherein the ruthenium catalyst is prepared from $Ru(NO)(NO_3)_3$.

11. The lean $NO_x$ trap composition of claim 1 wherein the lean $NO_x$ trap composition further comprises magnesium.

12. The lean $NO_x$ trap composition of claim 11 wherein the lean $NO_x$ trap composition comprises about 1 to about 20% by weight of washcoat of magnesium.

13. A lean $NO_x$ trap composition comprising:
a support material;
about 0.1 to about 10% by weight of washcoat of a ruthenium catalyst wherein the ruthenium catalyst is free of other precious metals; and
about 5 to about 50% by weight of a $NO_x$ absorbent material comprising an alkaline earth metal;
wherein the lean $NO_x$ trap composition has a storage efficiency of at least 70% at a temperature in a range of from about 400° C. to about 500° C., and a conversion efficiency of at least 50% at a temperature in a range of from about 300° C. to about 450° C.

14. A method of removing harmful gases from an automobile exhaust containing $NO_x$, CO, and hydrocarbons, the method comprising:
contacting a lean $NO_x$ trap composition with a first exhaust gas mixture, the first exhaust gas mixture comprising exhaust gases from an internal combustion engine operating in a fuel-lean condition, the lean $NO_x$ trap composition comprising:
a support material;
a ruthenium catalyst wherein the ruthenium catalyst is free of other precious metals; and
a $NO_x$ absorbent material comprising an alkaline earth metal;
wherein the lean $NO_x$ trap composition has a storage efficiency of at least 70% at a temperature in a range of from about 400° C. to about 500° C., and a conversion efficiency of at least 50% at a temperature in a range of from about 300° C. to about 450° C.; and
contacting the lean $NO_x$ trap composition with a second exhaust mixture, the second exhaust gas mixture comprising exhaust gases from the internal combustion engine operating in a fuel-rich condition.

15. The method of claim 14 wherein the lean $NO_x$ trap composition has a storage efficiency of at least 80% at a temperature in a range of from about 400° C. to about 500° C., and a conversion efficiency of at least 60% at a temperature in a range of from about 300° C. to about 400° C.

16. The method of claim 14 wherein the lean $NO_x$ trap composition has a storage efficiency of at least 90% at a temperature in a range of from about 400° C. to about 500° C., and a conversion efficiency of at least 60% at a temperature in a range of from about 300° C. to about 400° C.

17. The method of claim 14 wherein the ruthenium catalyst is prepared from a chlorine-free precursor.

18. The method of claim 14 wherein the lean $NO_x$ trap composition further comprises magnesium.

19. The method of claim 14 wherein the lean $NO_x$ trap composition is applied to a substrate by washcoating.

20. The method of claim 14 wherein the ruthenium catalyst is applied before the alkaline earth metal.

* * * * *

UNITED STATES PATENT AND TRADEMARK OFFICE
CERTIFICATE OF CORRECTION

PATENT NO. : 7,622,095 B2  Page 1 of 1
APPLICATION NO. : 11/156898
DATED : November 24, 2009
INVENTOR(S) : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 999 days.

Signed and Sealed this

Twenty-sixth Day of October, 2010

David J. Kappos
*Director of the United States Patent and Trademark Office*